Figure 4:
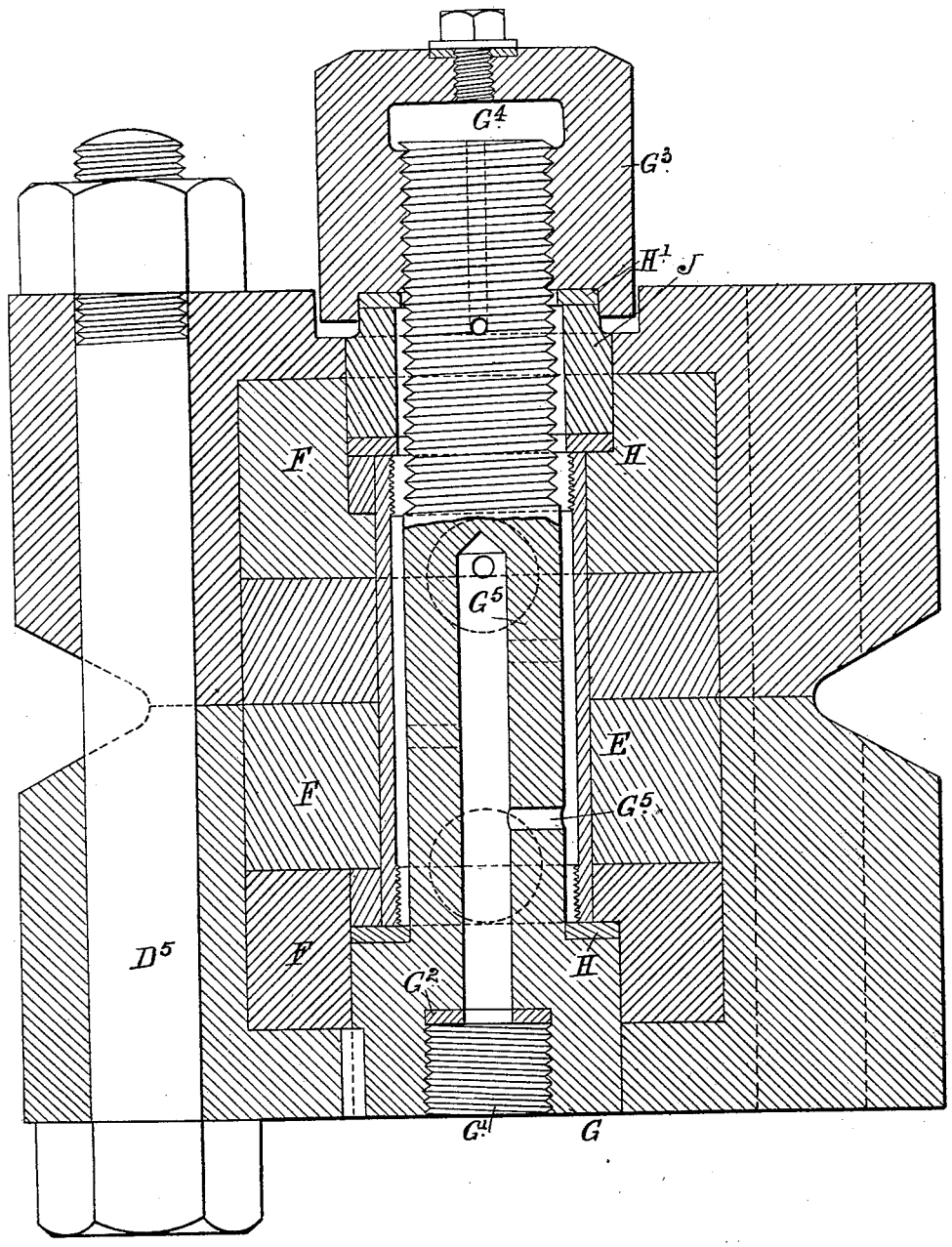

No. 633,430. Patented Sept. 19, 1899.
C. T. CROWDEN.
APPARATUS FOR FORMING TUBULAR JOINTS.
(Application filed Oct. 29, 1896.)
(No Model.) 5 Sheets—Sheet 1.
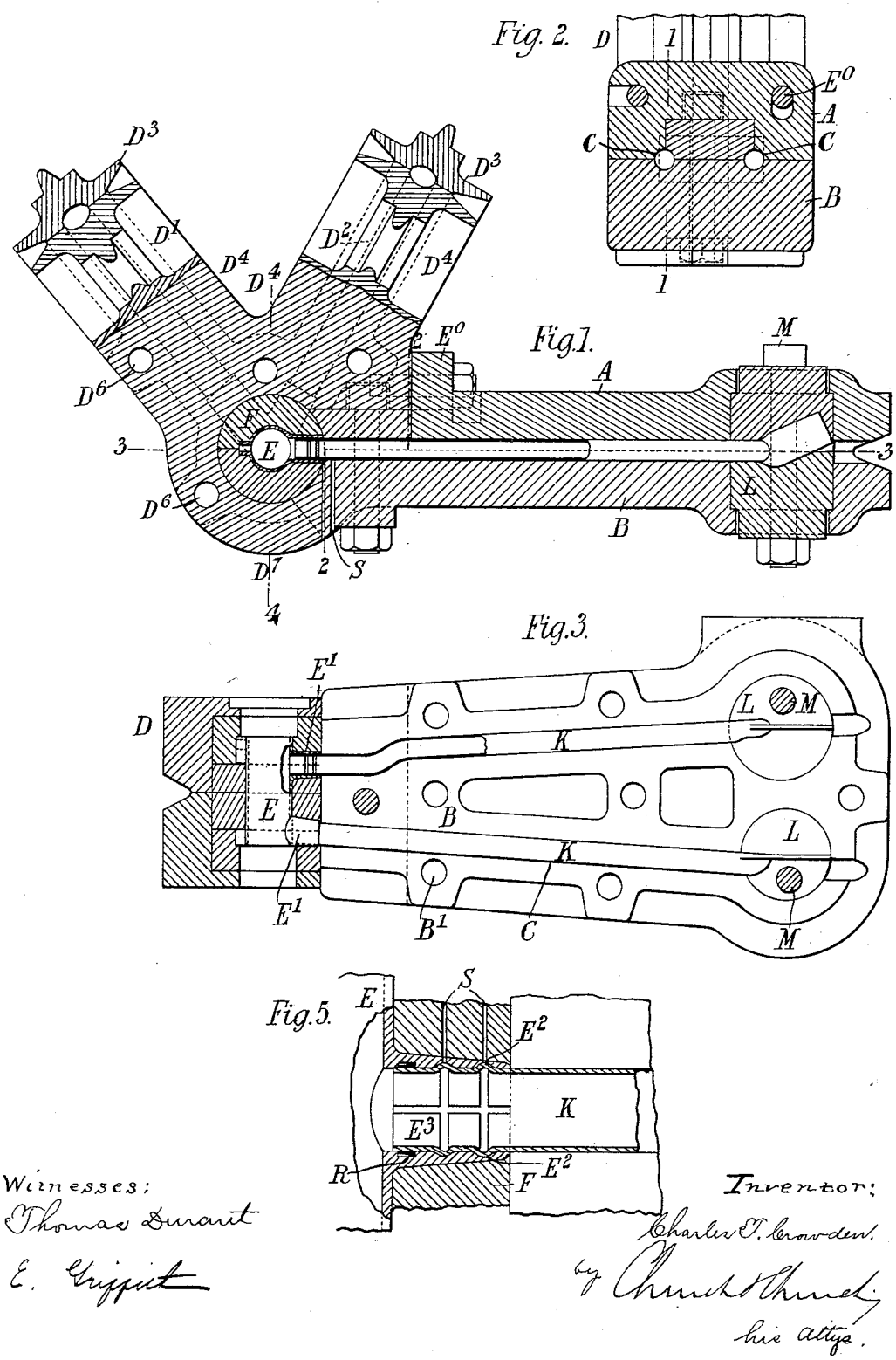
Witnesses:
Thomas Durant
E. Grippit
Inventor:
Charles T. Crowden.
by Church & Church
his attys.

No. 633,430. Patented Sept. 19, 1899.
C. T. CROWDEN.
APPARATUS FOR FORMING TUBULAR JOINTS.
(Application filed Oct. 29, 1896.)
(No Model.) 5 Sheets—Sheet 2.

Witnesses:
Thomas Durant
E. Griffith

Inventor:
Charles T. Crowden,
by Church & Church
his Attys.

No. 633,430. Patented Sept. 19, 1899.
C. T. CROWDEN.
APPARATUS FOR FORMING TUBULAR JOINTS.
(Application filed Oct. 29, 1896.)
(No Model.) 5 Sheets—Sheet 3.

Witnesses:
Thomas Durant
E. Griffith

Inventor:
Charles T. Crowden
by Church & Church
his attys

No. 633,430. Patented Sept. 19, 1899.
C. T. CROWDEN.
APPARATUS FOR FORMING TUBULAR JOINTS.
(Application filed Oct. 29, 1896.)
(No Model.) 5 Sheets—Sheet 4.
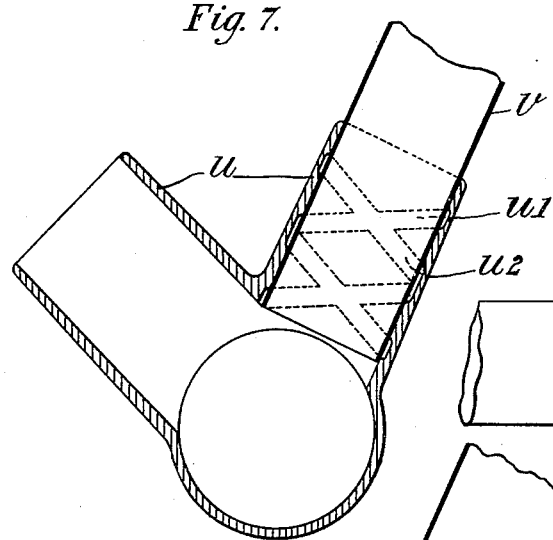
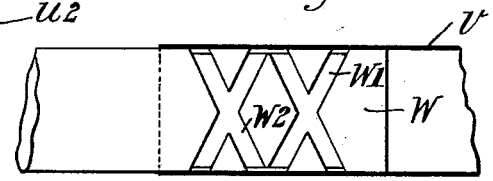
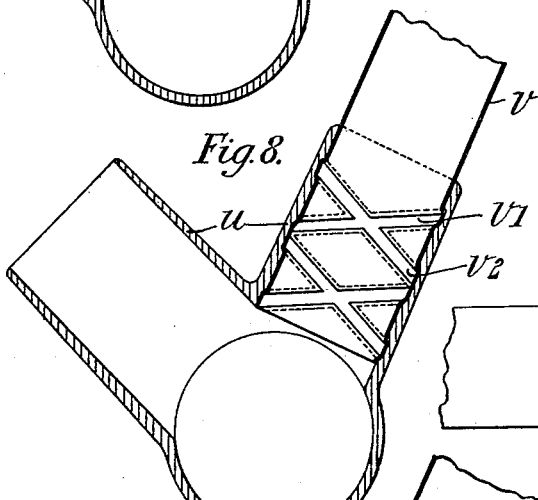
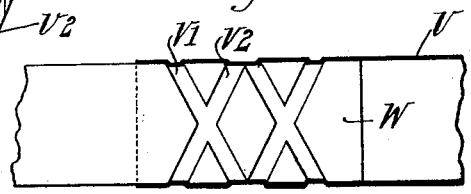
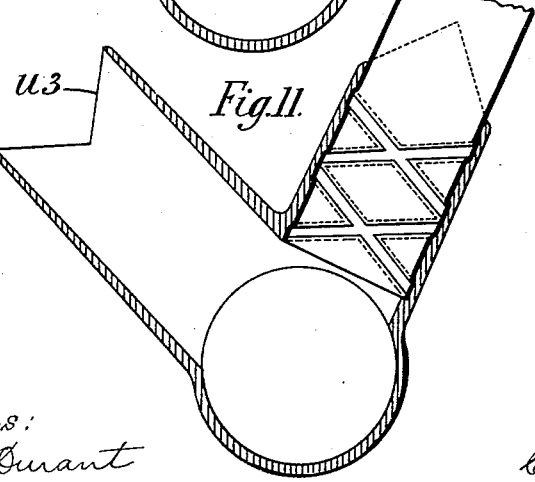
Witnesses:
Thomas Durant
E. Grippit
Inventor:
Charles T. Crowden,
by Church & Church
his Attys No. 633,430. Patented Sept. 19, 1899.
C. T. CROWDEN.
APPARATUS FOR FORMING TUBULAR JOINTS.
(Application filed Oct. 29, 1898.)

(No Model.) 5 Sheets—Sheet 5.

Witnesses
Thos. Durant
E. Trippit

Inventor:
Charles T. Crowden.
by Church & Church
his Attys.

THE NORRIS PETERS CO., PHOTO-LITHO., WASHINGTON, D. C.

UNITED STATES PATENT OFFICE.

CHARLES THOMAS CROWDEN, OF BEESTON, ENGLAND.

APPARATUS FOR FORMING TUBULAR JOINTS.

SPECIFICATION forming part of Letters Patent No. 633,430, dated September 19, 1899.

Application filed October 29, 1896. Serial No. 610,473. (No model.)

*To all whom it may concern:*

Be it known that I, CHARLES THOMAS CROWDEN, a subject of the Queen of England, residing at Beeston, England, have invented certain new and useful Improvements in Apparatus for Forming Tubular Joints, of which the following is a specification, the same having been patented in the following countries, to wit: Great Britain, No. 22,721, November 27, 1895; Hungary, No. 8,474, October 30, 1896; Austria, No. 47,659, March 2, 1897; France, No. 260,681, October 24, 1896; Belgium, No. 124,210, October 26, 1896; Spain, No. 19,824, November 21, 1896; Italy, No. 42,877/105, October 27, 1896; Canada, No. 54,684, January 21, 1897; India, No. 395/96, September 13, 1897; Transvaal, No. 1,253, November 16, 1896; Victoria, No. 13,927, February 9, 1897; New South Wales, No. 7,244, February 5, 1897; Tasmania, No. 1,824, February 8, 1897; Queensland, No. 3,739, filed February 6, 1897; South Australia, No. 3,538, February 2, 1897; Natal, No. 25/1,897, January 25, 1897, and New Zealand, No. 9,261, February 12, 1897.

This invention relates to the making of tubular joints and certain tubular articles, and although the invention is applicable to such joints in general I will describe it as applied to cycle frames and hubs and the like, to which it is peculiarly applicable.

The expression "tubular joint" hereinafter employed is to be understood as including a joint in which only one of the parts is tubular, as well as joints comprising more than one tubular portion.

In carrying out one part of this invention I take the parts to be joined—say, for example, one of the frame-tubes and a lug or angle piece or bracket—and place them in any suitable supporting device or mold, in which I secure them in a manner to support the parts as may be required.

My object is to force certain portions of the one piece of metal into corresponding portions or recesses of or in the other piece of metal, and to effect this I prefer to apply to the interior of the joint pressure in an outward direction. Preferably I employ fluid-pressure for this purpose, one way of effecting this being to connect one or both of the parts to be joined with a hydraulic-pressure apparatus, closing up the open ends of the joint as may be necessary and then applying the pressure. Cup-leathers, pressure-washers, or other devices, or glands, stuffing-boxes, or other packing may be employed for this purpose; but I do not limit myself in this respect.

The indentations, recesses, or equivalent in one of the parts—say the outer one—may be formed in the process of manufacturing that part, as by rolling, casting, or the like, or the mold may be so formed that when the pressure is applied it will have the effect of forcing outward both parts of the joint, portions of the outer part of the joint thus entering the recesses in the mold and portions of the inner joint entering the recesses thus provided in the outer joint. I prefer to form the interlocking portions in various directions, shapes, or sizes, so as to prevent movement of the joint in all directions, and I may employ any suitable fluid.

Another way of obtaining the pressure without the use of the ordinary means of obtaining hydraulic pressure—such as accumulators, engines, pumps, &c.—would be to place the mold with the joints filled with water into a refrigerator and by the expansive force of the forming ice obtain the desired result.

By this invention all the parts can be finished before the joints are made, so that no subsequent filing or similar operation is required, and the whole frame may be put together at once, a suitable jig or mold being provided and the pressure applied to all the joints simultaneously, or the joints may be made successively.

With this method of making joints no brazing, sweating, or the like is required, as the joint can be made sufficiently strong without this. Nevertheless I may employ any of these methods in combination with the previous method, if desired. In certain cases leakage of pressure fluid past the meeting surfaces of the joints can be minimized or prevented by tinning the parts before they are put into the mold or jig. The pressure may be applied from outside in addition to or instead of the inside, in the latter case the necessary resisting power being provided—as, for example, by plugging up the inner tube. The invention may be carried out where only one of the parts is tubular.

In a modification of the methods above disclosed the hydraulic pressure inside the tube may be used as a mandrel to support the interior of the joint while the interlocking projections and recesses are formed from the outside by hydraulic pressure.

In the case of two tubular connections—say the joining of a tube into a lug or bracket—the latter is bored to fit the tube and has a right and left hand spiral or other inclined groove cut or formed in or upon its interior surface. The tube is inserted into the lug and is forced outward, so as to swell parts of it into the recesses in the wall of the lug by internal hydraulic pressure. The joints may be brazed or sweated, if desired.

Where the tube is to be attached to a solid body—as, for example, a rod, pin, or stud—the spiral or other grooves may be formed upon the outer surface of the stud, which would then be placed inside the tube and the latter pressed upon the stud, so that portions of it enter the recesses, as already described. By this means an effective lock against either torsional or tension strains is secured.

The joints are preferably made longer than usual and may be bird-mouthed or open at the ends to reinforce the joints in place of or in addition to the internal bushes usually employed with ordinary brazed joints. Even where a hollow lug or equivalent is employed the tube may, if preferred, be placed outside it and the recesses formed in the outer periphery of the lug instead of inside.

Figure 6:
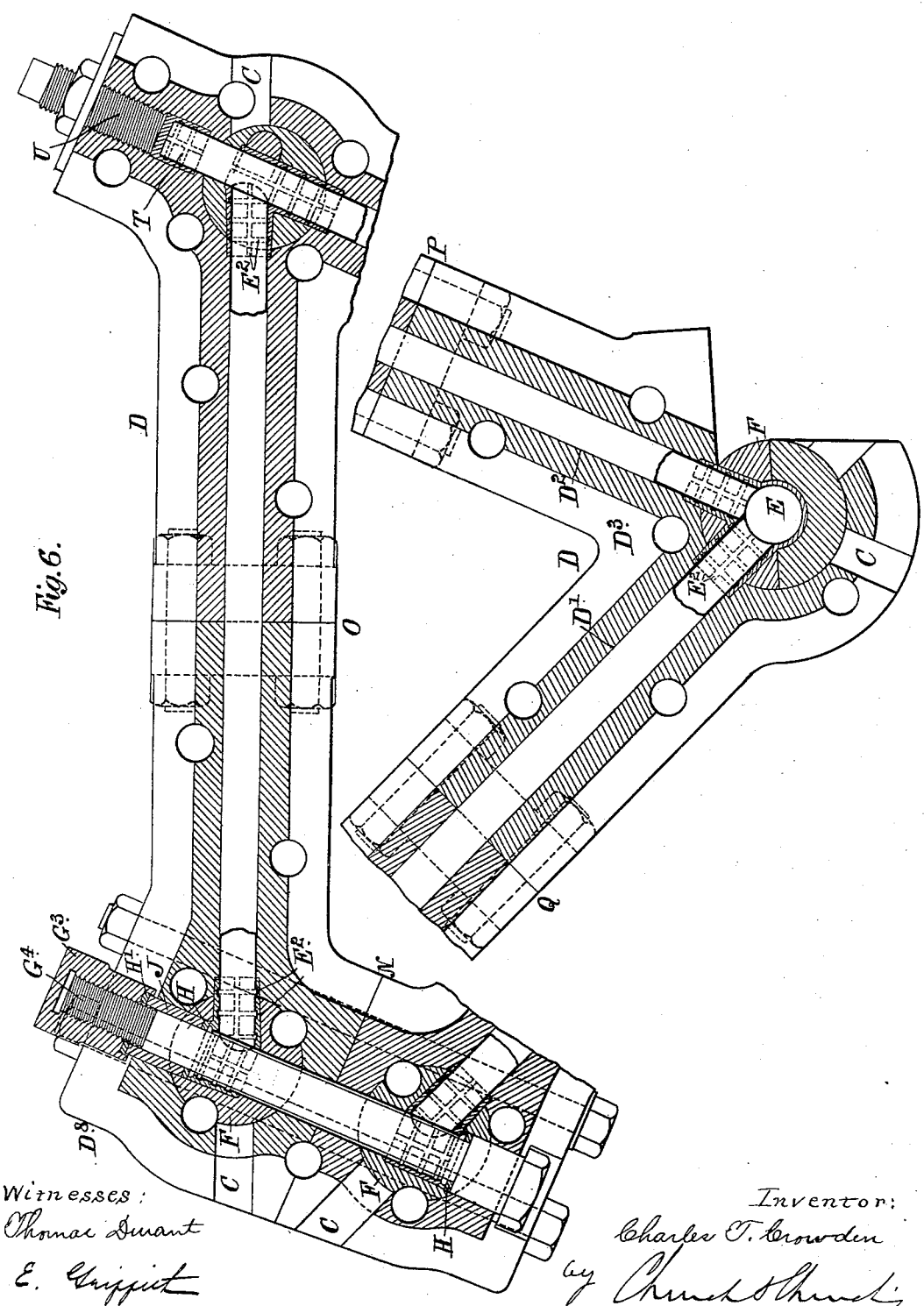
Figure 12:
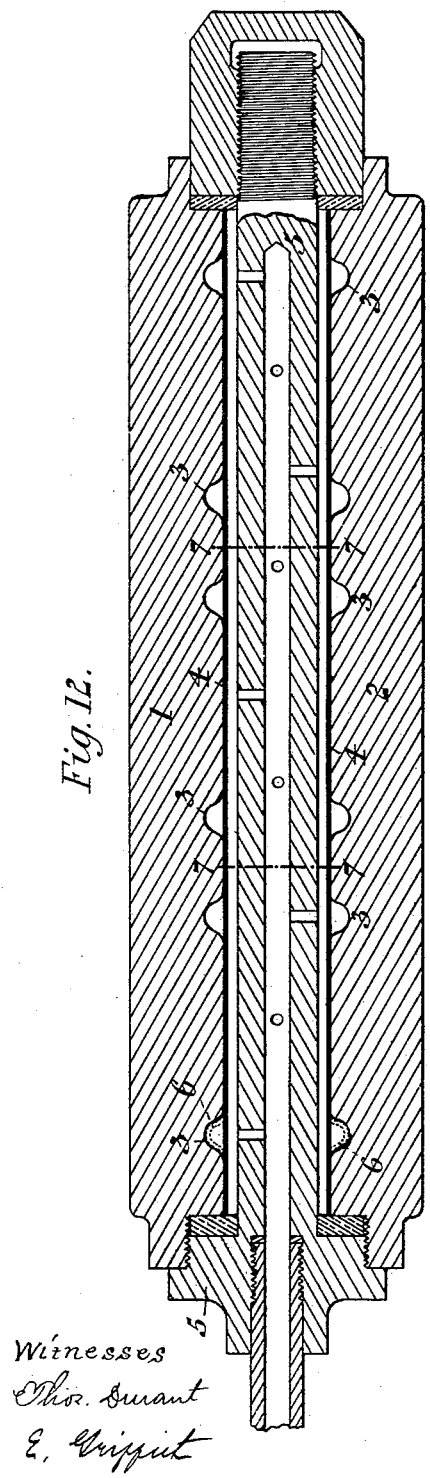
Figure 13:
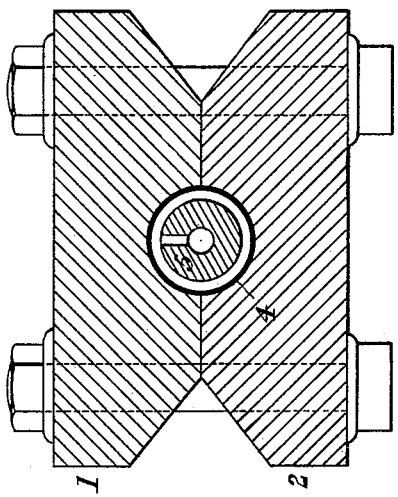

In the accompanying drawings, Figure 1 is a vertical section on the line 1 1 of Fig. 2 of the lower part of a jig or mold for the diamond frame of a safety-bicycle according to this invention. Fig. 2 is a transverse section on the line 2 2 of Fig. 1. Fig. 3 is a plan of the lower part of the mold, partly in section, on the line 3 3 of Fig. 1. Fig. 4 is a transverse vertical section on the line 4 4 of Fig. 1. Fig. 5 is a section of one of the improved joints made in the said jig or mold and of the parts which aid in its production. Fig. 6 is a vertical central section, in a plane a little to one side of the central plane, of the remaining part of the jig or mold which takes the front portion of the diamond frame. Figs. 1, 2, and 3 are drawn to a smaller scale than that of Figs. 4 and 5, and Fig. 6 is drawn to a smaller scale than that of Figs. 1, 2, and 3. Fig. 7 shows in longitudinal central section a tube inserted into a lug or bracket in readiness for a joint to be constituted by the mutual engagement of these parts, and Fig. 8 is a similar view showing the joint completed. Fig. 9 shows in longitudinal central section the end of a tube placed over a stud in readiness for a joint to be constituted by the mutual engagement of these parts, and Fig. 10 is a similar view showing the joint completed. Fig. 11 is a view similar to Fig. 8, showing the lug "bird-mouthed," as aforesaid. Fig. 12 is a longitudinal central section of a mold constructed according to this invention with a tube within it, the latter being so treated in the mold as to form hubs for cycle-wheels in the manner hereinafter described. Fig. 13 is a transverse section of Fig. 12.

Like letters and figures indicate like parts throughout the drawings.

With reference, first, to Figs. 1 to 6, A and B are parts of the mold intended to take the bottom stays. These parts are intended to separate in a horizontal plane along the line 3 3 of Fig. 1. Between their meeting faces are tubular cavities C to receive the two bottom stays. For convenience of boring these and similar cavities are carried right through the jig or mold, as shown, these and other portions of the mold having axial perforations $D'$ $D^2$, intended to receive the bottom tube and down-tube of the cycle-frame, respectively. Studs $E^0$ retain the part D of the mold in proper relationship with the part A, being passed through slotted holes for convenience in separating the parts when the mold lies on its side. Other bolts pass through holes $B'$ in the part B and similar holes in the part A to keep the parts A and B together. The part D is divided along a vertical plane containing the axes of the perforations $D'$ $D^2$ into two sections $D^3$ $D^4$, which when the mold is in use are retained together by bolts $D^5$, Fig. 4, passed through holes $D^6$ in the sections $D^3$ $D^4$, Fig. 1. At $D^7$, where the several sections of the mold meet, there is a cavity to receive the bottom bracket-barrel E of a safety-bicycle. Within this cavity are dies F to support the barrel in the desired position. These dies are divided, so as to draw back for convenience in getting the parts operated upon into and out of the mold.

G is a tubular bolt inserted in the barrel E, as shown, with the ends of which it is caused to make a tight joint by means of packing-rings H, which rest against the ends of the bottom bracket-barrel E. The bolt G is screw-threaded at $G'$ to receive a pipe by which fluid under pressure is admitted to its interior.

$G^2$ is a packing-ring at the bottom of the screwed cavity $G'$ to make a tight joint between the hydraulic connections and the bolt. At the opposite end of the bolt is a nut $G^3$, engaging with a screw-threaded portion $G^4$ thereof and acting to compress a packing-ring $H'$ against a movable bush J, which latter encircles the bolt and in turn compresses the adjacent packing-ring H against the end of the barrel and draws all the other joints up tight.

$G^5$ are perforations which deliver the fluid from the hollow interior of the bolt G into the interior of the barrel E.

It will be seen that by the provision of the packing-rings H $H'$ and means for compressing them between the bolt G and the barrel and between the bush J and the barrel none of the fluid delivered into the interior of the barrel can escape past the ends thereof, and therefore all of it is compelled to flow into the interior of the tubular portions of the frame received in the tubular perforations C $D'$ $D^2$, expanding them outwardly, the several members of the frame being drilled or otherwise perforated to allow a free circulation of the pressure fluid all through them, so that the tubes of the structure are used for conveying the pressure fluid to the joint or joints.

It will be seen that the socket E', Fig. 3, in place in the perforation C and connected to the barrel E is provided (see now Fig. 5) with internal grooves or corrugations $E^2$, some of them parallel with the length of the bottom stay K, which is to be engaged with the socket E', and others annular and transverse to the length of that stay. The admission of fluid under pressure to the interior of the stay-tube K causes those portions of it which are opposite the corrugations $E^2$ to expand thereinto in such a manner that the tube K and socket E' become firmly engaged with each other, as shown in Fig. 5. In some of the other views certain of the joints are shown with their inner portions expanded into the outer portions, while others are shown with the inner portions in readiness for similar expansion. The operation of expansion just described with reference to the tube K and socket E' occurs simultaneously in all the other joints of the apparatus which are contained in the mold and are correspondingly constructed.

To prevent as far as possible the pressure fluid from getting past the joints and to enable any fluid which may happen to get into or through the joints to escape, it is desirable to provide in each joint arrangements which in this case are shown only in Fig. 5, being too small to show clearly in the other views. These arrangements comprise a groove R in one member of the joint containing a rubber or other packing-washer $E^3$, which encircles the other member. This packing minimizes, if it does not entirely prevent, passage of fluid between the meeting faces of the joint. Any fluid which may happen to leak past the joint and get into the mold or jig escapes by "escapements" or holes, such as S; otherwise it would tend to produce equilibrium of pressure inside and outside the joint and injuriously affect the work of the apparatus. If desired, these escapements can extend right into the joint, as shown, to prevent accumulation of fluid in it.

L, Figs. 1 and 3, are divided cylindrical dies placed in cavities at the ends of the parts A and B and held together by bolts M, which pass right through them, as shown. These blocks, like the dies F, are for the purpose of enabling different forms and constructions of joints to be treated in the one jig by substituting different blocks or dies with cavities suitably shaped to receive the parts.

The construction of the part of mold illustrated in Fig. 6 is substantially the same as that shown in Figs. 1 to 4, except that it is preferably made in segments divided at N, O, P, and Q, being, however, bolted together at those places when ready for subjection to fluid-pressure. Tubular packing-pieces can be inserted at N and P to vary the height of the mold to suit different heights of frames. At T, Fig. 6, is a superfluous joint, employed as a test-joint, by examining which after the operation is finished the condition of the remaining joints can be estimated. U is a plug to permit this inspection to be readily made. Suitable channels are provided in the apparatus to enable the air trapped therein to escape, and screw-plugs are used to close those channels. At $D^8$, Fig. 6, is a mold for the joints of the steering-head tube substantially similar to that at $D^7$, Fig. 1, for the bottom bracket-barrel.

With reference now to Figs. 7 to 11, U is the lug or bracket, V is the tube to be joined to it, and $U'$ $U^2$ are oblique grooves on the interior of the lug or bracket, the grooves $U'$ extending in a direction reverse to that of the grooves $U^2$. After the parts U and V have been placed in the position indicated in Fig. 7 oblique ribs or corrugations $V'$ $V^2$, Fig. 8, are formed on the tube V, as shown, to engage, respectively, the grooves $U'$ $U^2$. By employing reverse grooves $U'$ $U^2$ there is no possibility of the tube V becoming unscrewed from the lug or bracket U.

In Figs. 9 and 10 the tube V encircles a stud W, the latter being grooved externally with reverse grooves $W'$ $W^2$, into which enter corrugations $V'$ $V^2$, formed on the tube, by forcing parts of its circumference inward toward its center into the position indicated in Fig. 10 after the tube and stud have been placed in readiness, as indicated in Fig. 9.

In Fig. 11 one end of the lug is shown as having a bird-mouthed end $U^3$, which serves instead of the usual liner and gradually lessens the support instead of forming an abrupt termination thereof, which is apt to result in fracture. Similar extensions may be employed for a like purpose at the end of any tube forming part of a tubular joint. The reverse oblique corrugations or ribs or grooves need not necessarily cross each other, as shown, for they may occur at different portions of the length of a joint.

With reference now to Figs. 12 and 13, the mold therein employed is divided longitudinally into two parts 1 and 2, in each of which are internal corrugations 3, so arranged that the interior of the mold-cavity corresponds in shape to the form which is to be given to a plain tube inserted therein in order to convert it into a tube corrugated at intervals, so that it can be separated into short portions, each of which latter would constitute a hub for a cycle-wheel or the like. 4 is a short length of plain tube placed in the mold in readiness to be operated upon by fluid under pressure admitted to its interior by way of the perforated plug 5. Dotted lines, as at 6, show the tube after it has become corrugated by the operation of the pressure fluid in a similar manner to that which has hereinbefore been described with reference to the formation of corrugations in the tube illustrated, for instance, in Fig. 8. By cutting the corrugated tube into short lengths by separating it along the dotted lines 7 7 after taking it out of the mold a number of cycle-wheel hubs are produced.

I claim—

1. A jig or mold for forming the joints between tubular bodies by hydraulic pressure having connecting die-cavities corresponding in diameter to the external diameter of the bodies to be united and means for forcing fluid-pressure into both the cavities whereby the overlapping ends of the two bodies placed within said cavities may be pressed into engagement with each other; substantially as described.

2. A jig or mold for forming the joints between tubular bodies by hydraulic pressure having die-cavities of differing diameters corresponding to the differing external diameters of the bodies to be united and means for forcing fluid-pressure into the cavities whereby the end of the inner or smaller body projecting within the larger body may be expanded into engagement with said outer or larger body; substantially as described.

3. A jig or mold for forming joints between tubular bodies by hydraulic pressure, having a main die-cavity and a branch die-cavity communicating with the main cavity arranged at an angle with relation thereto and having a fluid-pressure inlet communicating with said main die-cavity substantially as and for the purpose described.

4. A jig or mold for forming joints between tubular bodies by hydraulic pressure having a main die-cavity, and a series of branch die-cavities arranged angularly with relation to said main die-cavity and communicating therewith and a fluid-pressure inlet leading to said main die-cavity; substantially as described.

5. The combination with a jig or mold for forming joints between tubular bodies by hydraulic pressure, of independent dies mounted therein and having die-cavities corresponding in diameter to the external diameter of the bodies to be united and means for forcing fluid-pressure into both the cavities whereby the overlapping ends of the two bodies placed within said cavities may be pressed into engagement with each other; substantially as described.

6. The combination with a jig or mold for forming joints between tubular bodies by hydraulic pressure of removable dies mounted therein and having die-cavities corresponding in diameter to the external diameter of the bodies to be united and means for forcing pressure into the cavities whereby the overlapping ends of the two bodies placed within said cavities may be pressed into engagement with each other; substantially as described.

7. A jig or mold for forming joints between tubular bodies by hydraulic pressure having die-cavities corresponding in diameter to the external diameter of the bodies to be united and also having vents extending through the walls of the mold at approximately the meeting-point of the die-cavities whereby fluid-pressure between the walls of the telescoping ends of the bodies placed within the die-cavities may be relieved; substantially as described.

8. The combination with a jig or mold for forming joints between tubular bodies by hydraulic pressure having die-cavities corresponding in diameter with the external diameter of the bodies to be united and a fluid-pressure inlet communicating with said die-cavities, of means for sealing the joint between said tubular bodies to prevent the entry of fluid into the joint when subjected to pressure; substantially as described.

9. The combination with a jig for forming joints between tubular bodies by hydraulic pressure, having die-cavities corresponding in diameter with the external diameters of the bodies to be united, a fluid-pressure inlet communicating with said die-cavities and packing for sealing the joints between said tubular bodies to prevent the entry of fluid into the joint when subjected to pressure; substantially as described.

10. In an apparatus for expanding tubular bodies by internal hydraulic pressure, the combination with a jig or mold having a die-cavity of packings located at opposite ends of said die-cavity with means for adjusting said packings toward each other to clamp the tubular body between them and to close its ends and a fluid-pressure duct communicating with the die-cavity through one of the packings; substantially as described.

11. A jig or mold for expanding tubular bodies by internal hydraulic pressure, having a main die-cavity, packings located at opposite ends of said die-cavity and means for adjusting said packings toward each other whereby the tubular body may be clamped between the packings and its ends closed, said mold also having branch die-cavities arranged at an angle with relation to the main die-cavity and communicating therewith and a fluid-pressure duct communicating with the main die-cavity through one of the packings; substantially as described.

12. A jig or mold for forming joints between tubular bodies by hydraulic pressure, having main die-cavities and branch die-cavities interposed between the main die-cavities arranged at an angle with relation thereto, and communicating therewith, and a fluid-pressure inlet; substantially as described.

In testimony whereof I have hereto set my hand in the presence of the two subscribing witnesses.

CHARLES THOMAS CROWDEN.

Witnesses:
HAW W. WADE,
HARRY B. BRIDGE.